June 20, 1950            F. E. NULL            2,511,869
STABILIZED VERTICAL PENDULUM
Filed March 27, 1947            2 Sheets—Sheet 1
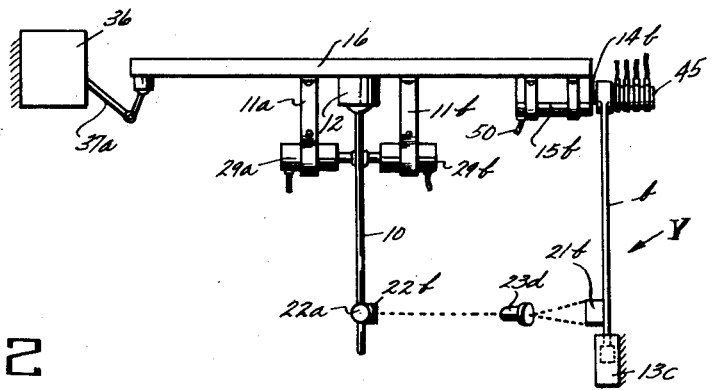
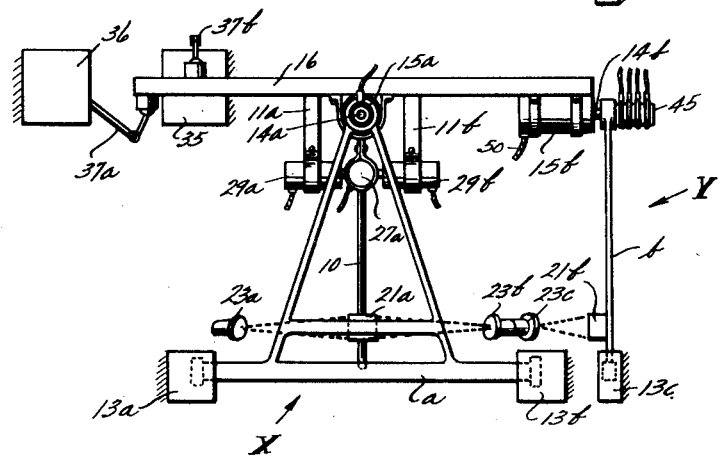
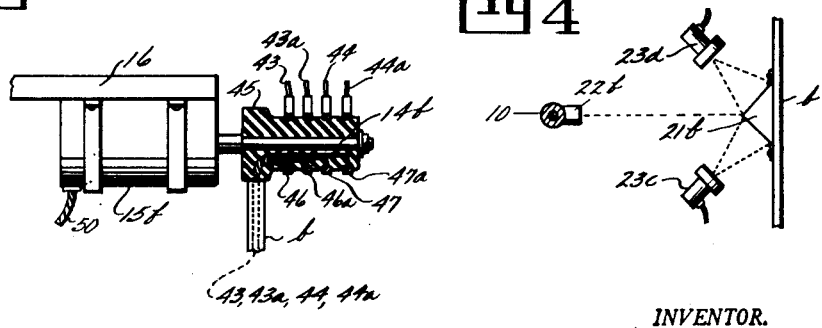
INVENTOR.
FAY E. NULL June 20, 1950 F. E. NULL 2,511,869
STABILIZED VERTICAL PENDULUM
Filed March 27, 1947 2 Sheets-Sheet 2
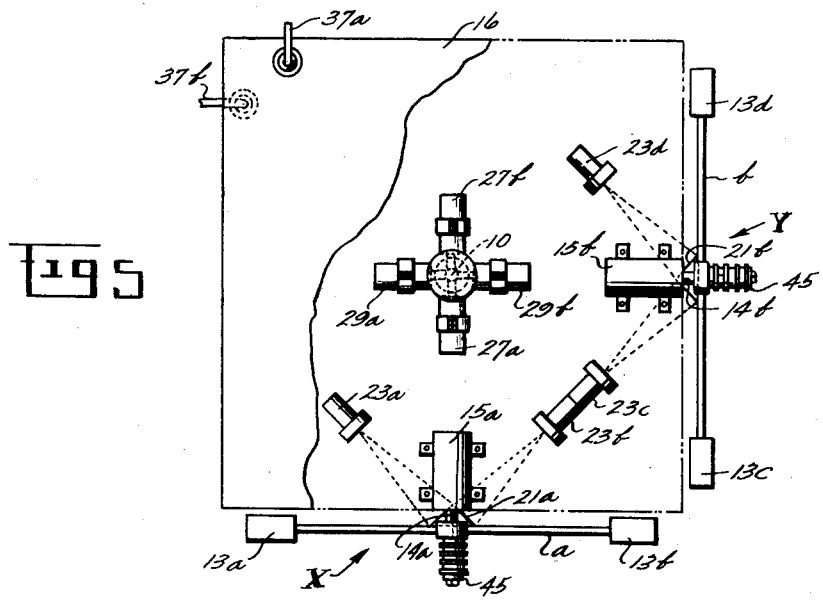
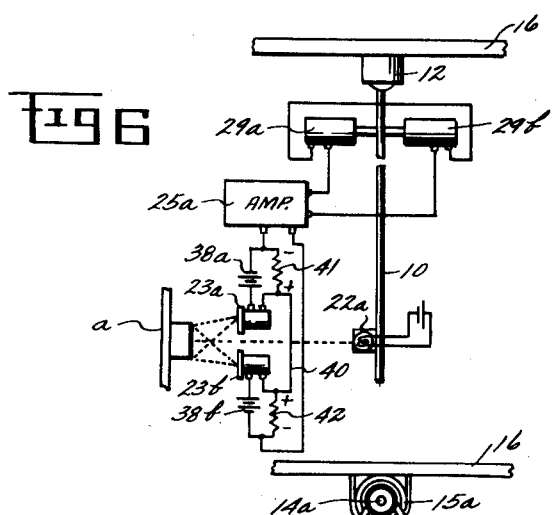
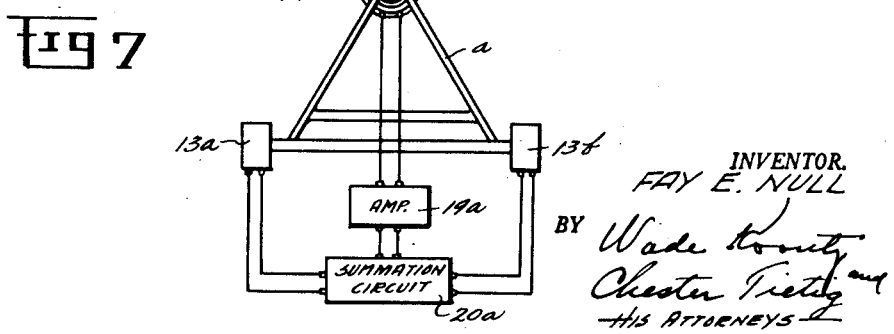
INVENTOR.
FAY E. NULL Patented June 20, 1950

2,511,869

UNITED STATES PATENT OFFICE 2,511,869

STABILIZED VERTICAL PENDULUM

Fay E. Null, Dayton, Ohio

Application March 27, 1947, Serial No. 737,688

11 Claims. (Cl. 33—220)

(Granted under the act of March 3, 1883, as amended April 30, 1928; 370 O. G. 757)

The invention described herein may be manufactured and used by or for the Government for governmental purposes without payment to me of any royalty thereon.

This invention relates to a stablized vertical reference pendulum. Such a device is useful in preserving a standard of reference in many arts, for example, air navigation, bombing from aircraft, aerial mapping, seismology and others. Primarily it is a pendulum that will continue to point to the center of the earth despite any reasonable degree of acceleration to which it may be subjected.

In the past, gyroscopes have been solely depended upon for this purpose. These instruments are subject to drift and cannot be regulated as closely as is desirable. They require caging at rather short intervals. My device may employ a gyroscope for preliminary stabilization of the pendulum support, after which the improved features of my pendulum stabilizing apparatus come into play and remove the remaining moderate speed and fast acceleration-created movements from the pendulum to hold it to a degree of stability impossible to the unaided gyroscope.

One object of the present invention is therefore to provide a pendulum stabilized to the position of pointing toward the center of the earth from a comparatively unstable point of support with a degree of constancy hitherto unknown.

Another object of the invention is to provide a pendulum apparatus which will automatically cancel out acceleration and deceleration forces imparted to it.

Another object is to provide a general method for stabilizing a pendulum to an unprecedented degree.

In the drawings:

Fig. 1 is a partially schematic elevational representation of a main pendulum to be stabilized and one of the two side pendulums used to stabilize the main one;

Fig. 2 is a view corresponding to Fig. 1 with the addition of the second side pendulum for stabilizing the main one;

Fig. 3 is a detail, partially in section showing a reference pendulum stabilizing motor and its slip ring electrical connections;

Fig. 4 is a plan view, partly in section, of the light-beam stabilizing means for controlling the main pendulum;

Fig. 5 is a plan view, partially schematic, of the top of the table support for the pendulums and the arrangement of apparatus, including the main pendulum as seen from above;

Fig. 6 is an electric circuit diagram including the main pendulum and two of the four electromagnets which are used to steady it; and Fig. 7 is an electric circuit diagram showing a side pendulum and its electrical connections to accelerometers and its supporting motor.

In the figures, 10 is the pendulum which is to be stabilized. This pendulum is also hereinafter referred to as the main pendulum. X and Y are two other pendulum assemblies which are disposed at right angles to each other. The assemblies X and Y each contain a reference pendulum $a$ and $b$ which are arranged to swing at right angles to each other. The purpose of the reference pendulum assembly X is to stabilize the main pendulum 10 in the plane in which the reference pendulum $a$ swings while the purpose of reference pendulum assembly Y is to stabilize it in the direction that the reference pendulum $b$ swings. The reference pendulum assemblies X and Y are identical except in regard to their position and the direction of swing of their pendulums $a$ and $b$. Therefore, the following description of the pendulum assembly X will also apply to pendulum assembly Y. The corresponding parts of the latter assembly, however, are designated by the same reference characters as those employed for pendulum assembly X except that they are followed and distinguished by letters which occur in alphabetic order.

Referring now to Figs. 1 and 2 which include main pendulum 10 and reference pendulum assemblies X and Y, triangular reference pendulums $a$ and $b$ are tightly mounted on and suspended from the drive shafts 14$a$ and 14$b$ of electric motors 15$a$ and 15$b$. These motors belong to assemblies X and Y respectively and are mounted at right angles to each other under a plane table 16 on adjacent edges thereof. Each pendulum $a$ and $b$ is equidistant from the main pendulum 10 which is suspended from the table 16 by a ball and socket joint 12. The table 16 is gyroscopically stabilized on two axes by gyroscopes 35 and 36 respectively, which are connected to the table by jointed cranks 37$a$ and 37$b$ respectively. The first crank is mounted under the table 16 and the second crank over it, so that the table will be held as level as possible. By "level" is meant at right angles to the main pendulum 10 when it is pointing toward the center of the earth.

Attached to the outer ends of each pendulum $a$ and $b$, there are accelerometers 13$a$, 13$b$, 13$c$ and 13d respectively. These are of the piezoelectric type in which the compression of a crystal by an accelerating force generates a minute amount of current. Such current is taken by wires as shown in Fig. 7, to summation circuits 20a and 20b respectively, thence to amplifiers 19a and 19b respectively and thence to motors 15a and 15b respectively.

The summation circuit is arranged to deliver a current representing the sum of the accelerometer currents to the amplifier and the circuit connections are such that the amplified sum is delivered to the motor 15a to oppose whatever movement caused the accelerometer current, thus stabilizing pendulum a or b. Thus for an infinitely sensitive and accurate accelerometer, the pendulums a and b will remain parallel to their initial directions when the device is operated. Actually the accelerometers are not sensitive enough to correct for the very small acceleration caused by the changing direction of the earth's radius and gravitational force as the pendulum is moved over the earth's surface. A slip ring arrangement shown in Fig. 3 is used for the transfer, two leads 43 and 43a being used to convey the electric impulse from accelerometer 13a up one leg of the pendulum and leads 44 and 44a from accelerometer 13b up the other pendulum leg. These four leads are led through a hub 45 in the interior of which they are distributed to slip rings 46, 46a, 47 and 47a. The brushes 43, 43a, 44 and 44a then transfer the current to the summation circuit 20a, to the amplifier 19a and to the motor winding terminal 50.

Pendulum 10 is the slave of pendulums a and b, being forced to follow b in the Y direction and pendulum a in the X direction. The force applied to the pendulum 10 is magnetism, which is selected because it can be applied without mechanical connection. In order that magnetism may be selectively applied, four electromagnets 27a, 27b, 29a and 29b are arranged symmetrically about the pendulum shaft, which is a distributed mass of iron.

The means for originating an opposed force to be electromagnetically applied to the pendulum 10 is preferably photoelectric. Both pendulums a and b carry a glass prism 21a or 21b respectively. A self-contained light source 22a is mounted on pendulum 10 so that it will illuminate both prisms equally. The second light outlet is designated 22b (Fig. 1). So long as the pendulums a and b are motionless in respect to pendulum 10, both faces of the prisms 21a and 21b will reflect an equal amount of light into two photocells for each prism, namely 23a and 23b for prism 21a and 23c and 23d for prism 21b.

Referring now to Fig. 6, it will be seen that in the electric circuit provided, the photocells 23a and 23b buck each other. They are connected by a lead 40 into which are connected two resistors 41 and 42 from opposite sides. These resistors also oppose each other's polarity. They are supplied by opposed batteries 38a and 38b. Current is picked off from points between the batteries and the resistors by leads which supply an amplifier 25a. From the amplifier other leads supply series-connected electromagnets 29a and 29b. This complete circuit is of course duplicated in pendulum assembly Y.

This invention is susceptible to numerous changes and substitutions without departing from its spirit. As an example of equivalency, the motors 15a and 15b may be replaced by an electrically controlled air jet system or by electromagnets. Such an air jet system can also replace the electromagnets 27a, 27b, 29a and 29b. The light beam photocell balancing circuit can be substituted by one in which the pendulum a or b actuates a slider on one or more electrical potentiometers. However, the preferred form of the invention has been illustrated and described.

In the system illustrated and described as well as in the equivalent systems, the unbalance of the illumination of the photocell pairs 23a and 23b or 23c and 23d constitutes the impulse that is applied to the electromagnet pairs or other corrective devices for the main pendulum 10. Such unbalance may be first amplified in any conventional way before being applied to the corrective device such as the electromagnet pairs. It is evident therefrom that pendulum 10 will be corrected against oscillation substantially as much as the reference pendulums a and b.

Assuming that the apparatus is mounted on an airplane which is about to take off, the following series of events may occur during take-off and subsequent flight.

The reference pendulum a or b which is in the line of flight (or both) will undergo lag due to the acceleration to which its support 16 is subjected. The accelerometers 13a, 13b or 13c, 13d will generate current piezoelectrically, because they are held fixed to the airplane body while the pendulum is not fixed; and the signal will be added by the summation circuit 20a or 20b or both and will be amplified by the amplifiers 19a or 19b or both. The amplified signal is then applied to the motors 15a or 15b or both to check or attempt to check the relative displacement from the vertical on the part of either pendulum a or b from perpendicularity to table 16. It must be realized that neither pendulum a or b can undergo large swings because the arc is limited by the fixed accelerometers. After a small arc is traversed, all that the pendulum a or b can do is to increase the pressure on the piezoelectric crystals in the accelerometers which may, it is obvious, either be mounted fixed or to swing with the pendulum.

No piezoelectric accelerometer is known at present which is sensitive enough to generate any amplifiable signal from the acceleration caused by the changing of the earth's radius and hence gravitational force as the pendulum is moved over the earth's surface during flight after take off. A position of vertical rest is therefore assumed by the pendulums a and b in respect to table 16 after stable flight is attained until the airplane undergoes additional acceleration or deceleration. Correction for deceleration is of course as easily and automatically made by the pendulum as for acceleration.

As soon as a pendulum a or b is displaced from vertical in respect to table 16, or if the table is so displaced in respect to a pendulum, the amount of light reflected by the prism 21a or 21b becomes unequal. Either photocell 23a receives more light than photocell 23b or vice versa or the unbalanced condition may affect photocells 23c and 23d. The photocell receiving the greater amount of light originates a dominating signal over the weaker signal originated by the other photocell thereby determining in which direction the current which is the algebraic sum of the two signals, will go. A proportional effect is thereby achieved regardless of whether the signal from the accelerometers is linearly proportional or not. Responsive to the proportional signal, the amplifier 25a or 25b generates an electrical force which when applied to electromagnets 29a, 29b or 29c and 29d and from them applied to the main pendulum 10, effectively prevents that pendulum from moving to follow pendulums a or b except in a greatly diminished fashion. Pendulum 10 is the slave of pendulum a and b, but on a reduced scale. There need be only enough relative displacement between the main and control pendulums to slave the position of the main pendulum to that of the control pendulum. The main pendulum and the control pendulums do not necessarily have different periods or masses.

When the supports of the control pendulum are accelerated the force required to maintain it vertical is proportional to the acceleration, as the force to accelerate a pendulum bob is equal to its mass times its acceleration, and since the main pendulum is placed very closely to the position of the control pendulum, and its support suffer the same acceleration as the control pendulum then the force on the main pendulum must also be proportional to the acceleration of the frame-carrying supports carrying the control and reference pendulums.

The force applied to both the control and main pendulums to maintain them vertical must necessarily be proportional to the common acceleration of their supports.

The only acceleration sensing device is mounted on the control pendulum. The counter force on the control pendulum is proportional to the acceleration of the supports. The control forces on the main pendulum are merely those required to slave the main pendulum position to that of the control pendulum.

The control force on the control pendulum is sufficient to prevent rotation due to all accelerations of the supports except for the very low acceleration caused by change in direction of the earth's gravitational pull due to different positions on the earth's surface, this low acceleration keeping the pendulum always parallel to the earth's radius at a given position on the earth's surface. The main pendulum is always slaved in position to that of the control pendulum by a photoelectric or similar pickoff indicating relative change in position.

The main pendulum is free to swing in the planes of the control pendulums which would normally be perpendicular to each other, e. g. one control pendulum swinging in the north-south direction, and the other in the east-west direction.

In one adaptation of the present device to scientific use, the main pendulum 10 determines the reference line to the center of the earth for use in conjunction with a seeker determining a line to a star. For such use, the main pendulum 10 is preferably a hollow tube with a light source at substantially its center, or within the universal joint 12 with the tube continuing above the table 16. With this modification used in conjunction with one sheet of coordinate paper normal to and below the table 16 and comparable with a vertical plane and a second sheet of coordinate paper also disposed vertically but above the table 16 and at right angles with the sheet of coordinate paper below the table 16 and comparable to a profile plane, accurate readings may be taken from the main pendulum 10 by the lines of light appearing upon the two pieces of coordinate paper. The lines so appearing upon the two pieces of coordinate paper in the vertical and profile planes, respectively, from the light beams shining from the open ends of the main pendulum 10 and thereby defining the coordinates of a line directly toward the center of the earth, may then be compared with a light beam from a seeker and directed toward a desired star, such as Polaris. The angle between these two reference lines may then be used in the science of air navigation.

The invention claimed is:

1. In a pendulum apparatus, a triangular pendulum, a motor supporting said pendulum by the apex of the latter from the drive shaft of the motor, acceleration-responsive members mounted on the two lower corners of said pendulum at right angles to its axis, means for summing up the acceleration responses of said acceleration-responsive members, means for amplifying the summed up responses and means for applying the amplified responses to said motor to rotate in a direction opposite to that of the forces causing the acceleration responses.

2. In combination, a main pendulum, a pair of oppositely disposed reference pendulums, a table support for all of said pendulums, gyroscopic means for stabilizing said table support, means for detecting movements of said reference pendulums when said forces tend to move the latter from true vertical and means for generating electromagnetic forces proportional to and controlling the movements of said reference pendulums, the main pendulum being constrained to follow the motions of the reference pendulums in their mutually perpendicular planes of motion.

3. In combination, a pendulum to be stabilized and two reference pendulums disposed at right angles to each other, all of said pendulums being subject to the same forces, a stabilized table supporting each reference pendulum, means for detecting an incipient movement of each of the reference pendulums and converting such movement into an electric impulse tending to stabilize one of said reference pendulums, at least four solenoids surrounding the main pendulum to be stabilized and electric circuits for originating electrical impulses from the tilting of the table support and for transmitting said electrical impulses to the respective solenoids positioned to control corresponding movements of the pendulum to be stabilized whereby to convert said impulses into magnetic forces tending to stabilize said pendulum.

4. The combination recited in claim 3 in which the electric circuits for each reference pendulum assembly include photoelectric means to balance each other exactly when there is no movement of the reference pendulums and to transmit an electrical impulse proportional to the degree of unbalance caused by movement of said reference pendulum.

5. In combination, a main pendulum which is to be stabilized, a pair of reference pendulums disposed oppositely to each other, a table support for each reference pendulum, four electromagnets disposed in the horizontal plane which is at a right angle to the vertical axis of said main pendulum, means for detecting an incipient movement of the reference pendulums, and means for generating in those of said electromagnets which are positioned in the direction to make the motion of the main pendulum follow that of the reference pendulums, a force which is proportional to and similar in direction to the force causing said incipient movement.

6. The combination set forth in claim 5 in which the force generating means comprises a source of electric current, a plurality of photocells controlling said current selectively to said electromagnets, a source of light, reflectors of light mounted on each reference pendulum to activate one or more of said photocells upon movement of a reference pendulum to direct a current which is proportional to the degree of unbalanced illumination of said photocells into the electromagnets which each of said photocell pairs are connected so as to control the movement of the main pendulum, and means including an electric motor adapted to correct a reference pendulum in response to a force tending to oscillate said pendulum.

7. In combination, a pair of reference pendulums, a table for suspending each pendulum, a gyroscope for stabilizing said table in each direction, accelerometers attached to each reference pendulum, means for amplifying and applying the current produced in said accelerometers during acceleration thereof to oscillate the reference pendulums in a direction opposing the action of the disturbing force, light reflecting means mounted on a low point on each reference pendulum, a point source of light for illuminating each of said light reflecting means equally when said table is level, electric circuits adapted to become unbalanced by the movement of said light reflecting means, a main pendulum, four electromagnets disposed symmetrically about the shaft of said pendulum and energizable by unbalanced current in said electric circuits so that they will selectively control magnetic forces generated in them to make the main pendulum follow the reference pendulums.

8. In an apparatus for stabilizing a vertical pendulum, the combination which comprises a plane table, a pair of gyroscopes arranged to stabilize said table, a magnetically susceptible main pendulum of distributed mass centrally and universally supported from said table, at least four electromagnets symmetrically arranged about said pendulum on a single plane, a pair of triangular reference pendulums disposed at the edges of said table at right angles to each other, an electric motor mounted under said table at each side which is adjacent to the reference pendulums, said reference pendulums being mounted on the drive shafts of said motors, a piezo-electric accelerometer mounted on each lower end of each reference pendulum, an electrical summation circuit adapted to receive the indications of each pair of accelerometers and to combine them, an amplifier adapted to receive the impulses so combined, electrical connections, including slip rings for applying the amplified impulses to the respective electric motor to oppose the force giving rise to the accelerometer impulse, a prism mounted centrally on the lower part of each reference pendulum, a source of light carried on the main pendulum and adapted to illuminate each side of each prism equally when the system is at rest, a pair of photocells for each reference pendulum adapted to be illuminated equally by the reflection from the respective prism opposite them when the system is at rest, an electric circuit adapted to balance the output of each pair of photocells when they are equally illuminated and when they are unbalanced, to communicate an impulse to that pair of electromagnets which can control the force giving rise to the impulse, said impulse imparted to said electromagnets being proportioned in time and amount to the substantially simultaneous force tending to oscillate one or more reference pendulums.

9. An apparatus according to claim 8 in which the main pendulum is hollow and a light source arranged to transmit light downwardly through the bore of said pendulum.

10. A vertical reference device comprising in combination a main pendulum, a secondary control pendulum free to swing in at least one of the planes of motion of the main pendulum, acceleration-responsive means mounted on said secondary pendulum, said second pendulum serving as a means responsive to gravity for defining an average vertical when accelerations acting thereon are small, an acceleration-responsive device, at least part of which is mounted on the control pendulum to develop an electrical signal proportional to that component of acceleration acting on the system in the plane of the control pendulum, means for amplifying said signal and means responsive to the amplified signal for applying the resulting force to the control pendulum opposing displacement thereof due to acceleration forces, the acceleration-responsive means on the control pendulum not having sufficient sensitivity to cause response of the control pendulum to the very low acceleration due to slow changes in the direction of gravity, and electromagnetic means utilizing signal generated by the control pendulum for slaving the position of the main pendulum to that of the control pendulum in the plane of allowed rotation of the control pendulum, said means leaving the main pendulum pointing substantially to the center of the earth and unaffected by the slow acceleration due to traverse of said pendulum and its support over long distances in vectorial relation to the earth through its atmosphere.

11. The reference device set forth in claim 10 in which the main pendulum is substantially a ferrous hollow tube.

FAY E. NULL.

REFERENCES CITED

The following references are of record in the file of this patent:

UNITED STATES PATENTS

| Number | Name | Date |
|---|---|---|
| 1,065,656 | Benni | June 24, 1913 |
| 1,386,953 | Robertson | Aug. 9, 1921 |
| 1,485,783 | Gardner | Mar. 4, 1924 |
| 2,193,707 | Baumann | Mar. 12, 1940 |
| 2,359,245 | Ritzmann | Sept. 26, 1944 |
| 2,362,616 | Cloud | Nov. 14, 1944 |
| 2,371,626 | Kecskemetic | Mar. 20, 1945 |
| 2,391,271 | Rich | Dec. 18, 1945 |